United States Patent
Kramarz-Von Kohout

(10) Patent No.: US 7,469,044 B2
(45) Date of Patent: Dec. 23, 2008

(54) CALLBACK WHEN NOT ENGAGED BY MEANS OF AUTOMATED REDIALLING IN COMMUNICATION NETWORKS

(75) Inventor: Gerhard Kramarz-Von Kohout, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 49 days.

(21) Appl. No.: 10/492,808

(22) PCT Filed: Oct. 15, 2002

(86) PCT No.: PCT/DE02/03863

§ 371 (c)(1),
(2), (4) Date: Aug. 31, 2004

(87) PCT Pub. No.: WO03/036928

PCT Pub. Date: May 1, 2003

(65) Prior Publication Data

US 2005/0014521 A1    Jan. 20, 2005

(30) Foreign Application Priority Data

Oct. 16, 2001   (DE) ................................ 101 50 492

(51) Int. Cl.
*H04M 3/42* (2006.01)

(52) U.S. Cl. ........................... 379/209.01; 379/210.01; 379/210.02; 379/210.03; 455/414.1; 455/417; 455/555

(58) Field of Classification Search ............ 379/209.01, 379/210.01, 210.02, 210.03, 209.1, 210.1, 379/210.2, 210.3, 229, 230, 231, 234; 455/414.1, 455/417, 555, 450, 451

See application file for complete search history.

(56) References Cited

U.S. PATENT DOCUMENTS

| | | | | | |
|---|---|---|---|---|---|
| 5,185,782 | A | * | 2/1993 | Srinivasan | 379/210.01 |
| 5,533,100 | A | * | 7/1996 | Bass et al. | 379/88.06 |
| 5,943,417 | A | | 8/1999 | Cox et al. | |
| 5,946,390 | A | * | 8/1999 | Boakes | 379/355.08 |
| 5,995,594 | A | * | 11/1999 | Shaffer et al. | 379/88.12 |
| 6,169,786 | B1 | * | 1/2001 | Dunn et al. | 379/88.25 |
| 6,574,324 | B1 | * | 6/2003 | Malik | 379/210.01 |
| 6,597,785 | B1 | * | 7/2003 | Burke et al. | 379/355.08 |
| 6,681,006 | B1 | * | 1/2004 | Pilkington et al. | 379/210.01 |
| 6,687,359 | B1 | * | 2/2004 | D'Arcy et al. | 379/209.01 |
| 6,961,559 | B1 | * | 11/2005 | Chow et al. | 455/414.1 |
| 2002/0141557 | A1 | * | 10/2002 | Strandberg | 379/210.01 |

FOREIGN PATENT DOCUMENTS

DE    19709408    8/1998

* cited by examiner

*Primary Examiner*—Tuan A Pham
(74) *Attorney, Agent, or Firm*—Christa Hildebrand; Norris, McLaughlin & Marcus

(57) ABSTRACT

The invention relates to a method of redialing in telecommunication networks for a call back when not engaged, whereby a caller carries out a call attempt to reach a callee, whereby the callee does not respond at firs. According to the invention, the callee may be reached without the caller having to continually undertake a further call attempt, whereby a radialling is automatically carried out by the relevant exchange within a given time window at given time periods and a connection to the callee is established should the same respond.

6 Claims, 1 Drawing Sheet

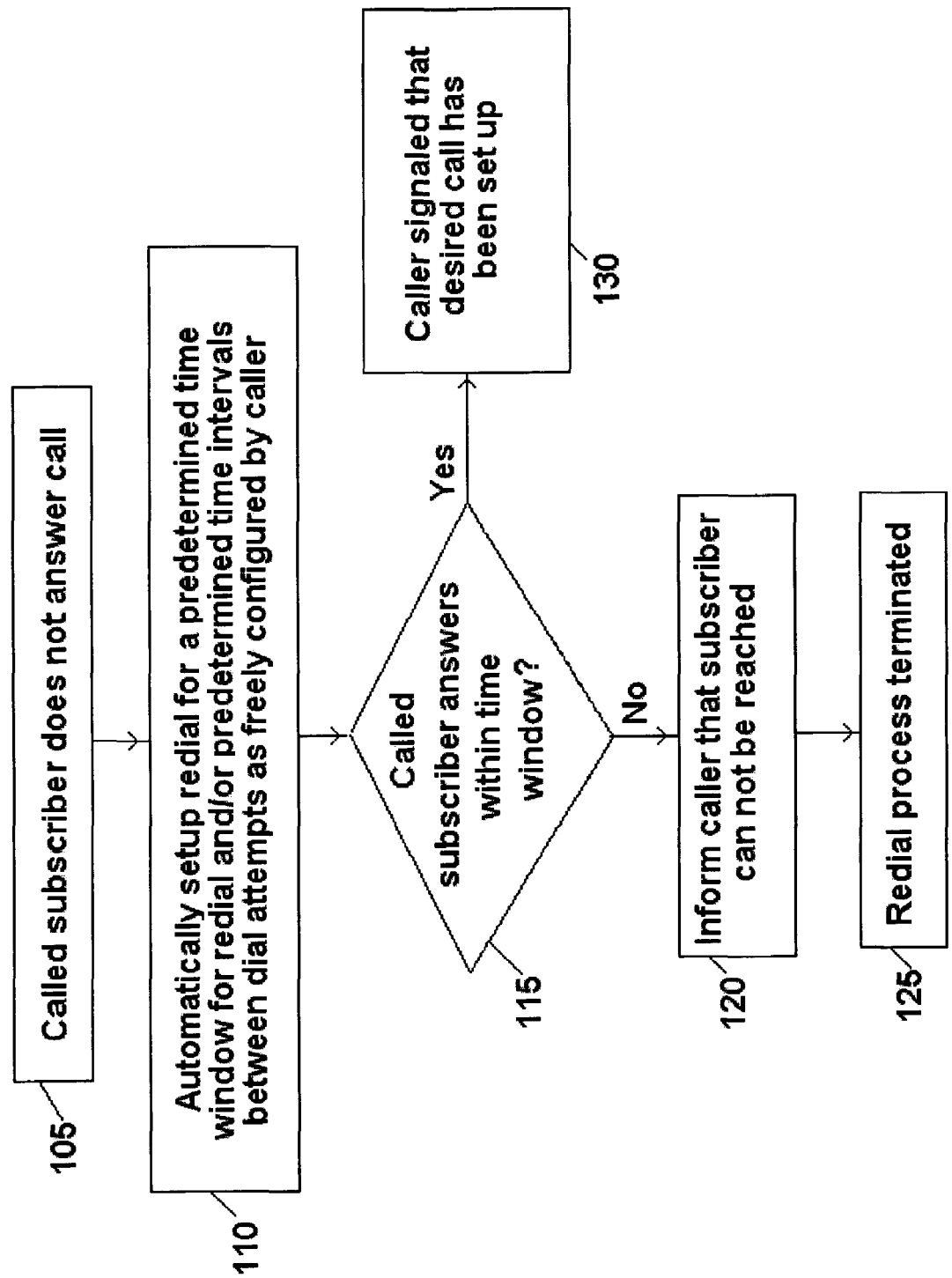

CALLBACK WHEN NOT ENGAGED BY MEANS OF AUTOMATED REDIALLING IN COMMUNICATION NETWORKS

BACKGROUND OF THE INVENTION

The invention relates to a method and a device for carrying out an automatic redial for a callback when not busy in telecommunications networks according to the preamble of the independent claims.

Call attempts wherein the called subscriber does not answer a call, are useless, unless third called subscriber has an answering machine or a mobile mailbox. The caller has as an only option to repeat the call attempt at a later time.

Terminals and telephone systems already exist in wired networks which take over the redialing function from the user by automatically calling the last dialed telephone number after a preset time. This redialing function can only be activated when the terminal of the called subscriber is "busy." Such automated redialing function is only incorporated in ISDN terminals and more sophisticated telephone systems. Similar functions are known in mobile telephone networks and in mobile telephone handsets. All these functions allow an automatic callback when busy. However, these conventional callback methods fail if the line is not busy and the called subscriber does not answer the call.

ISDN has a service "callback if no answer." A subscriber A attempts a call to a subscriber B. Subscriber B does not answer. If the function "callback if no answer" is activated, then a call is automatically set up the next time an activity is detected at subscriber B, i.e., next time subscriber B uses the telephone by, for example, making a call. In other words, this service only takes effect after subscriber B shows a certain activity. The invention attempts to remedy this disadvantage. How can this problem be solved if the subscriber B does not show an identifiable activity. For example, the subscriber B may already be reachable by phone since a long time without actually using his telephone.

U.S. Pat. No. 6,169,786 B1 discloses a method for redialing in telecommunication networks for a callback when the line is not busy. If a caller attempts a call to reach a called subscriber, but the subscriber initially does not answer the call, then a redial function is automatically performed by the telecommunication network in predetermined time intervals within a predetermined time window.

DE 197 09 408 A1 is directed to a method for redialing by a terminal, wherein telephone number is repeatedly dialed from a redial memory.

After receiving a not-busy signal. an automatic redial function is offered after a predetermined time interval. In the two conventional methods the caller is not informed when a redial was successful.

It is therefore an object of the invention to propose a method and a device for performing a redial for a callback when not busy in telecommunications networks, which operate independently of the used telecommunication network and the telecommunication terminal.

SUMMARY OF THE INVENTION

The method of the invention enhances the level of comfort for the communication subscriber. According to the invention, if a "not busy" is detected, the subscriber no longer needs to continuously redial and monitor the call manually, since redialing is performed automatically on the exchange side. An automatic redial on the terminal side is also possible.

In order to successfully convert an initially unsuccessful call attempt to an actual telephone call, the following solution is proposed as a novel service for calls from a telecommunication network to other networks, in particular mobile telephone networks, but also wired networks.

Referring to the Figure, initially at step 105, subsequent to call attempts, where the called subscriber does not answer the call, a redial is automatically set up by the exchange(step 110), if desired by the caller, within a predetermined time window and within predetermined time intervals, e.g., every fifteen minutes during the next ninety minutes. A call attempt by the exchange has preferably a relatively short wait time for accepting the call, so as not to irritate the called subscriber.

As soon as a called subscriber answers(step 115), the caller is signaled by a ring tone, i.e. as if the caller himself is called, that the desired call has now been set up(step 130). In order to bridge the time required for signaling the caller, the called subscriber(step 120) can receive a corresponding message, for example "please wait, you will be connected in a moment." If the caller does not answer and/or if the called subscriber hangs up in the meantime, then the process is canceled in step 125.

If the called subscriber does not answer within the time window, for example ninety minutes, then the process is also terminated. The caller is informed that the called subscriber cannot be reached. The caller can be informed through a distinct ring tone, a short message (SMS) or a voice recording.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

The FIGURE is a flow chart of the operation of the automatic redial process in accordance with the present invention.

DETAILED DESCRIPTION OF THE PREFERRED EMBODIMENTS

Preferably, the redial service on the exchange side can generally be activated and/or deactivated by the caller by calling a particular service telephone number. The caller may also be able to freely configure and edit the redial conditions, for example, set the time window for the redial and/or define the time intervals between dial attempts. Other customer-care-interfaces, e.g., activation/configuration via Internet, calling a hotline of the network operator, inputting a "directly acting" service activation code, telefax and the like are also feasible.

In order to use the service "callback when not busy" which is generally activated in advance, in an actual situation, i.e., when a call attempt is initially unsuccessful, there could be a key sequence which the subscriber inputs after hearing one or more dial tones for activating service "callback when not busy"—similar to the dial tones used in the conventional service "callback when busy." The telecommunication network can aid the subscriber, provided that the subscriber has activated the service, by transmitting to the subscriber after a certain time interval, e.g. approximately 70 seconds, a message which reminds the subscriber of a key code, e.g. *38#, for activating to service. Alternatively, a certain key sequence, for example *38#, may be transmitted to the communication network only after termination of an unsuccessful call, after hanging up. The network would then have to store the last dialed telephone number. In addition to the telephone number of the called subscriber, the exchange may also store the number of the caller for the predetermined time interval.

The service can be configured and/or edited in a similar manner. For example, the subscriber dials again the key sequence *38#, and the system—after a certain wait time, where the system awaits for the "ringing key"—offers a suitable options under menu control (voice-based or keypad-based). For example, the key sequence *38# 120# 90# 5# could indicate: callback when not busy, start in 120 minutes, attempt a call every five minutes during the following ninety minutes, in the manner described above.

In addition to the preferred exchange-based solution, a terminal-based solution can also be contemplated. For example, a mobile phone or terminal may recognize autonomously when the called subscriber does not answer the call, whereafter it can then automatically initiate a redial and/or can offer the caller suitable options, either under voice control or key control. A terminal-based solution operates only with terminals designed for this purpose.

The invention claimed is:

1. A method for redialing in telecommunications networks for a callback when a telephone line is not busy whereby a caller attempts a call to reach a called subscriber, wherein the called subscriber initially does not answer the call, whereby a redial is automatically performed at predetermined time intervals within a predetermined time window, comprising the steps of initiating the automatic redial by a responsible exchange wherein the predetermined time window as freely configured by the caller, wherein as soon as the subscriber answers, the caller is signaled by a ring tone that the desired call has set up, and informing the caller when the predetermined time window has expired and the called subscriber has not answered, whereafter redial is canceled wherein activating or deactivating the redial service provided by the exchange by the caller in the time window and the time intervals can be freely configured by the caller.

2. The method according to claim 1, further comprising the step of storing the telephone number of the called subscriber and the telephone number of the caller at the exchange for a predetermined time interval.

3. The method according to claim 1, further comprising the step up setting up a connection repeatedly by the exchange in the predetermined time intervals within the predetermined time window, wherein if the called subscriber answers, a connection to the caller is subsequently established.

4. The method for redialing in telecommunications networks for a callback when a telephone line is not busy, whereby a caller attempts a call to reach a called subscriber, wherein the called subscriber initially does not answer the call, whereby a redial is automatically performed at predetermined time intervals within a predetermined time window, comprising the steps of initiating the automatic redial by a terminal of the caller wherein predetermined time window as freely configured by the caller, wherein as soon as the caller subscriber answers, the caller is signaled by a ring tone that the desired call has been set up, and informing the caller when the predetermined time window has expired and the called subscriber has not answered, whereafter the radial is canceled wherein activating or deactivating the redial service provided by the exchange by the caller in the time window and the time intervals can be freely configured by the caller.

5. A device for redialing in telecommunications networks for a callback when a telephone line is not busy whereby a caller attempts a call to reach a called subscriber, wherein the called subscriber initially does not answer the call, whereby a redial is automatically performed at predetermined time intervals within a predetermined time window, the device comprises means for intermediately storing the telephone number of the called subscriber and the telephone number of the caller during a predetermined time window, and means for automatically carrying out a redial at predetermined time intervals within the predetermined time window as freely configured by the caller, whereby the means for intermediately storing the telephone numbers and for automatically carrying out the redial at the responsible exchange, means for signaling the caller by a ring tone that the desired call has been set up as soon as the subscriber answers, and means for informing the caller when the predetermined time window has expired in which the caller subscriber has not answered, and means for canceling the redial wherein activating or deactivating the redial service provided by the exchange by the caller in the time window and the time intervals can be freely configured by the caller.

6. A device for redialing in telecommunications networks for a callback when a telephone line is not busy whereby a caller attempts a call to reach a called subscriber, wherein the called subscriber initially does not answer the call, whereby a redial is automatically performed at predetermined time intervals within a predetermined time window, the device comprises means for intermediately storing the telephone number of the called subscriber and the telephone number of the caller during a predetermined time window, and means for automatically carrying out a redial at predetermined time intervals within the predetermined time window as freely configured by the caller, means for signaling the caller by a ring tone that the desired call has been set up as soon as the subscriber answers, means for informing the caller when the predetermined time has expired in which the called subscriber has not answered, and means for canceling the redial, and wherein the means for intermediately storing the telephone numbers and the means for automatically carrying out the redial are at a telecommunication terminal of the caller wherein activating or deactivating the redial service provided by the exchange by the caller in the time window and the time intervals can be freely configured by the caller.

* * * * *